Sept. 18, 1934.  V. C. ARMSTRONG  1,974,093
METHOD OF REFORMING OR RECONDITIONING RAIL JOINT SPLICE BARS
Filed April 12, 1933
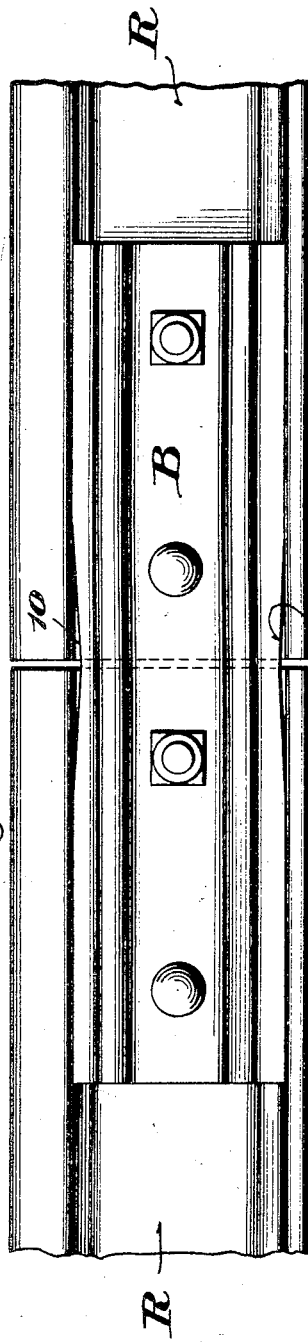
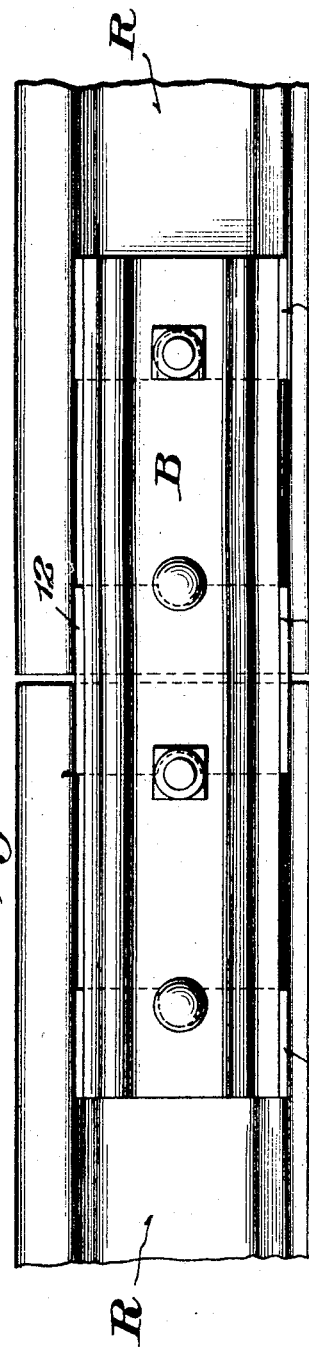
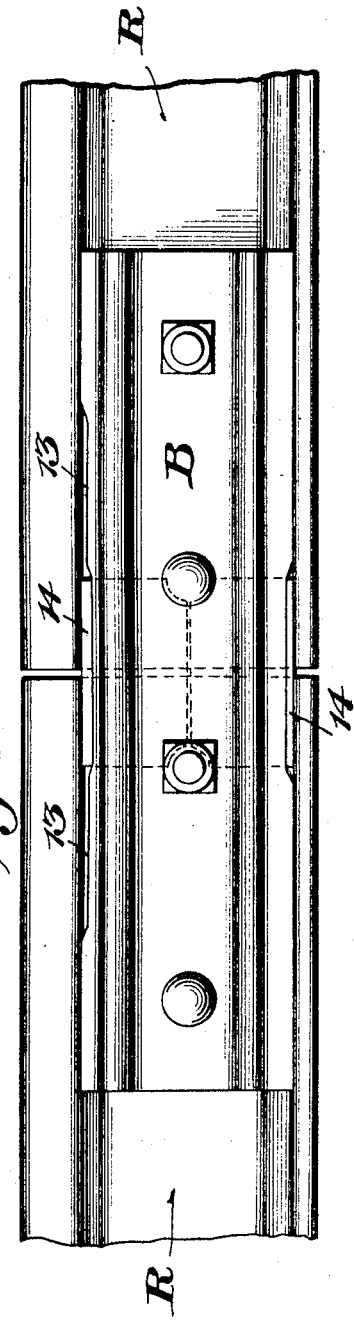
Inventor
Victor C. Armstrong,
By D. P. Wolhaupter
Attorney Patented Sept. 18, 1934

1,974,093

UNITED STATES PATENT OFFICE 1,974,093

METHOD OF REFORMING OR RECONDITIONING RAIL JOINT SPLICE BARS

Victor C. Armstrong, Hackensack, N. J., assignor to The Rail Joint Company, New York, N. Y., a corporation of New York Application April 12, 1933, Serial No. 665,801

6 Claims. (Cl. 29—169)

This invention relates to the art of reconditioning worn rail joint splice bars to obtain increased life and service therefrom, and has generally in view to provide a novel reconditioning method designed to increase the utility of the bars by rendering the same serviceable, in new combinations, with either old or new rails.

Due to the constant pounding of locomotive and car wheels over a rail joint the splice bars eventually become worn to such an extent that they no longer are fit for main track service. Both the head and the base fishing surfaces of the bars are subjected to wear, but the wear on the base fishing surfaces usually is relatively slight as compared with the wear on the head fishing surfaces. Moreover, the end portions of the heads of the bars are subjected to little or no wear, whereas, medially thereof, there is apt to occur material wear, this wear progressively decreasing over relatively short distances towards the ends of the bars.

When, due to wear on the fishing surfaces of a bar, especially wear on the head fishing surface medially thereof, the rail ends no longer are supported effectively against deflection, it becomes necessary either to replace the worn splice bar with a new bar or otherwise to recondition the joint to compensate for the wear.

As an economy measure it has become more or less general practice when practical to do so to reconstruct worn rail joints by reforming the old splice bars to compensate for the wear. However, according to prior splice bar reforming methods the bars invariably have been subjected to pressure between dies to cause the metal to flow outwardly into and to fill the worn or depressed areas thereof, thus either to restore the normal fishing height of the bars or, in some cases, to cause the normal fishing height to be exceeded within said areas to compensate for wear on the rails. But, inherently, this prior reforming practice has the disadvantage that the fibres of the metal, already compressed by the action of the rails in producing the worn or depressed areas, are reversely distorted, loosened and weakened or destroyed with consequent weakening of the bars to such an extent as to render them liable to easy fracture when they again are placed in service. Moreover, to reform a bar by subjecting it to pressure to effect an outward flow of the metal involves difficulties and complications, especially if the wear is appreciable.

Accordingly, the present reconditioning method involves a radical departure from prior reforming methods in that the worn bars are subjected to pressure to decrease rather than to increase their fishing height, which is quite advantageous not only because the difficulties and complications of prior methods are to a considerable extent avoided, but because the already compressed fibres simply are still further compressed without harmful reverse distortion, loosening or weakening of the same and the full bearing surfaces can be restored.

Preferably the bars are decreased in height throughout their lengths, and by amounts such that the worn depressions therein are completely eliminated and the reformed bars are of a fishing height to fit various sizes of rail. In that connection the reconditioned bars may be employed in different combinations. For instance, shims may be employed in conjunction with the reformed bars to adapt them for use with rails of either higher or lower fishing height than the rails which the bars were originally designed to fit. Moreover, instead of decreasing the height of the bars throughout their lengths, they may be decreased in height throughout the length of the worn areas only, and shims may be employed in the depressed areas to adapt the bars to fit rails of different fishing heights.

The invention is illustrated in the accompanying drawing, wherein:—

Figure 1 is a side elevation of a rail joint illustrating a worn splice bar.

Figure 2 is a view similar to Fig. 1 illustrating that the splice bar has been reduced in height throughout its length and the joint bearing and fishing height restored by means of the reformed bar and the use of shims; and Figure 3 is a view similar to Fig. 2 illustrating that the splice bar has been reduced in height throughout the length of the worn depressions only and that the joint has been restored by means of the reformed bar and the use of shims.

Referring to the drawing in detail, R, R designate the meeting end portions of a pair of rails and B a splice bar connecting said rails together.

As aforesaid, due to the constant pounding of locomotive and car wheels over a rail joint the splice bar eventually becomes worn to various degrees, and, as illustrated in Fig. 1 of the drawing, the critical wear generally is confined to the medial portions of the head and the base fishing surfaces of the bar as indicated at 10 and 11, respectively. Also, Fig. 1 illustrates that the wear on the head fishing surface of the bar usually exceeds the wear on the base fishing surface by a considerable amount.

When, as illustrated in Fig. 1, depressions have become so deeply worn in a splice bar that the rail ends no longer are properly sustained against deflection, the bar must either be replaced by a new bar or else the joint must otherwise be reconditioned to compensate for the wear to obtain additional service therefrom. Invariably, however, prior reforming methods have involved subjecting the worn bars to pressure to effect outward flow of metal into the worn or depressed areas thereof, and sometimes an even greater outward flow of the metal, with the result that the fibres of the metal are reversely distorted, loosened and weakened, thereby weakening the bars generally and rendering them liable to easy fracture when they again are placed in service.

As distinguished from prior reforming methods the present method primarily involves reducing the height of a worn bar, which is particularly advantageous because it avoids various complications and difficulties encountered in the practice of prior methods and because it avoids distortion, loosening or weakening of the fibres of the metal and permits restoration of the bearing surfaces throughout the full length of the bar.

In reconditioning a splice bar according to the present method the bar preferably is reduced in height throughout its length by an amount sufficient to eliminate the worn depressions and to adapt the bar to fit a rail of lower fishing height, whereby it may be used without shims with smaller rails and whereby it may, by the aid of medial and end shims 12, as illustrated in Fig. 2, be used either with rails of the same fishing height it was originally designed to fit or with rails of even greater height. Thus a new shim-type joint may be made with the reconditioned old bars.

Alternatively, a worn bar may, according to the present invention, be decreased in height throughout only the worn areas thereof or throughout the worn areas and only partially throughout the substantially unworn areas, and, by the use of shims placed in some or all of the depressed portions, may be adapted for use either with rails of the same fishing height that the bar was originally designed to fit or with rails of greater height. This is illustrated in Fig. 3 of the drawing from which view it will be observed that the bar has been medially decreased in height a maximum amount within the areas of maximum wear and a lesser amount between said areas and the ends of the bar, as indicated at 13, and that shims 14 are employed only in the areas of least height to adapt the bar to fit the rails.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. The method of reconditioning a worn rail joint splice bar which consists in subjecting the bar to pressure to reduce, without removal of metal from the bar, the fishing height of the bar throughout the length of at least the areas of the bar which have been subjected to maximum wear.

2. The method of reconditioning a worn rail joint splice bar which consists in subjecting the bar to pressure to reduce without removal of metal from the bar, the fishing height of the bar throughout its substantially unworn portions by an amount substantially equal to the reduction in fishing height due to wear where the wear is greatest.

3. The method of reconditioning a rail joint splice bar having a worn depression in the head fishing surface thereof which consists in subjecting the bar to pressure to reduce, without removal of metal from the bar, its fishing height sufficiently to eliminate the worn depression.

4. The method of reconditioning a rail joint splice bar having a worn depression in the base fishing surface thereof which consists in subjecting the bar to pressure to reduce, without removal of metal from the bar, its fishing height sufficiently to eliminate the worn depression.

5. The method of reconditioning a rail joint splice bar having worn depressions in the head and the base fishing surfaces thereof which consists in subjecting the bar to pressure to reduce, without removal of metal from the bar, its height sufficiently to eliminate the worn depressions.

6. The method of reconditioning a worn rail joint splice bar which consists in subjecting the bar to a compressive pressure to reduce, without removal of metal from the bar, its fishing height throughout its length by an amount sufficient to eliminate any worn depressions in the fishing surfaces thereof and to impart to the bar a fishing height to fit rails of less fishing height than the rails which the bar was originally designed to fit.

VICTOR C. ARMSTRONG.